United States Patent [19]

Lien et al.

[11] 4,130,690

[45] Dec. 19, 1978

[54] ABRASION RESISTANT COATINGS CURED IN THE PRESENCE OF $PF_5$, $SbF_5$, OR $HSbF_6$

[75] Inventors: Larry A. Lien, White Bear Lake; J. Lamar Zollinger, Maplewood, both of Minn.

[73] Assignee: Minnesota Mining and Manufacturing Company, Saint Paul, Minn.

[21] Appl. No.: 832,400

[22] Filed: Sep. 12, 1977

[51] Int. Cl.² ..................... B32B 27/36; B32B 27/06; B32B 9/04

[52] U.S. Cl. ................................. 428/412; 428/413; 428/417; 428/418; 428/429; 428/447; 428/450; 428/451; 428/454; 428/474; 428/483; 428/516; 428/518; 428/520; 528/10; 528/19; 528/23; 528/40

[58] Field of Search .............. 428/412, 413, 417, 418, 428/429, 447, 450, 451, 454, 474, 483, 520, 516, 518; 260/2 EC, 46.5 E, 47 EC

[56] References Cited

U.S. PATENT DOCUMENTS

| 3,955,035 | 4/1976 | Ito et al. ............................... 428/334 |
| 4,049,867 | 9/1977 | Ito et al. ............................... 428/447 |
| 4,649,861 | 9/1977 | Nozari ................................. 428/334 |

Primary Examiner—P. C. Ives
Attorney, Agent, or Firm—Cruzan Alexander; Donald M. Sell; Mark A. Litman

[57] ABSTRACT

Abrasion resistant coatings derived from epoxy-terminated silanes are desirable when formed by curing in the presence of $PF_5$, $SbF_5$, or $HSbF_6$.

4 Claims, No Drawings

ABRASION RESISTANT COATINGS CURED IN THE PRESENCE OF $PF_5$, $SbF_5$, OR $HSbF_6$

Abrasion and solvent resistant coatings derived from monomers having both epoxy and silane polymerizable functionalities have recently been reported in the art. U.S. Pat. Nos. 3,955,035 and 4,049,861 disclose polymers derived from monomers of the formula

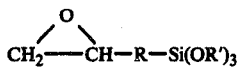

wherein R and R' are alkylene and alkyl respectively. The latter patent also discloses the use of monomers of the formula

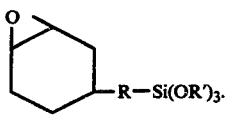

The polymers of both of these patents disclose polymers which have been significant improvements over prior art coatings.

U.S. Pat. No. 3,955,035 discloses the use of Lewis acids and Broenstad acids as catalysts, and U.S. Pat. No. 4,049,861 discloses the use of highly fluorinated aliphatic sulfonic and sulfonylic catalysts. The Lewis acids disclosed by U.S. Pat. No. 3,955,035 include $BF_3$, $SnCl_4$, $ZnCl_2$, $FeCl_3$, $SbCl_5$ and a complex of a Lewis acid and an oxygen-containing compound, e.g., ethyl ether. Most of these Lewis acid catalysts are slow acting and require long periods of elevated temperatures to effect a satisfactory cure. Increasing the amount of catalyst does not significantly lower these time and temperature requirements. The antimony pentachloride ($SbCl_5$) catalyst disclosed in that patent is the most efficient catalyst used. There is a drawback to the use of $SbCl_5$, however, and that is the fact that hydrogen chloride is released from the catalyst during polymerization and from the final product. Hydrogen chloride acts to damage coating apparatus and coatings. Both of these actions of hydrogen chloride are intolerable. Reducing the concentration of antimony pentachloride catalyst reduces the efficiency advantage of that catalyst and demands higher temperatures and/or longer cure times, and does not completely eliminate the adverse effects of the hydrogen chloride released.

It has been found in the practice of the present invention that certain Lewis acid catalysts are able to combine both low time and temperature requirements and also avoid problems of apparatus and coating damage.

It has been found in the present invention that $PF_5$, $SbF_5$ and $HSbF_6$ are rapid acting catalysts which do not damage coating apparatus and polymeric coatings derived from monomers of both epoxy and silane functionality.

The polymers useful in the practice of the present invention are those derived from monomers of the formulae:

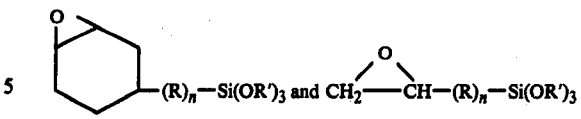

wherein R is a non-hydrolyzable divalent radical (aliphatic, aromatic, or mixed aliphatic and aromatic) of one to less than 20 carbon atoms composed of only C and O atoms in the backbone of R and no more than one atom of O for every two C atoms and no adjacent O atoms in the backbone; n is zero or one; and R' is alkyl of 1 to 8 carbon atoms.

Preferably R is $C_1$ to $C_{10}$ alkylene and most preferably 2 to 4 carbon atoms and R' is preferably alkyl of 1 to 8 carbon atoms and most preferably 1 to 4 carbon atoms. Most preferably R is $-CH_2-O-(CH_2)_m-$ wherein m is 1 to 5.

Preferably the final polymer product will have at least 15% by weight of its units derived from epoxy-terminated silane monomers. The remaining units are derived from materials copolymerizable with silanes and epoxies, including but not limited to polyfunctional silanes (e.g., di-, tri-, and tetraalkoxy silanes) and mono- or polyfunctional epoxy materials. The haze value of the coating should not exceed 30% according to ASTM D 968-51 using 1 liter of sand over 10-11 seconds. Preferably the haze value should be less than 20%.

Abrasion resistance is evaluated by two different tests, both of which have been found necessary to fully evaluate abrasion resistance.

One test is referred to as the falling sand test which is modified from ASTM D 968-51 (1966). This test may be summarized as follows:

1000 ml of standard sand (no more than 15 g retained in No. 20 sieve and not more than 5 g passes through No. 30 sieve after 5 minutes of continuous sieving of a 100 g sample) flows at a rate of 1 liter per 10 to 11 seconds onto a specimen of the material to be evaluated, said specimen held at an angle of 45° to the path of sand falling out of a cylindrical tube, the closest point of impact on the specimen to the 0.750±0.003 inch I.D. 36±0.01 inch long tube being 1 inch.

Measurements are taken as percent haze which measures the dispersion of light off of the abraded surface using an instrument such as the Gardner Hazemeter made by the Gardner Laboratory, Inc.

The second test is referred to as steel wool abrasion. In this test 000 steel wool is pressed against the surface with a pressure of about 0.3 to 0.4 kilograms per square centimeter. The weighted steel wool is oscillated in a straight line over the coated surface for twelve cycles (15 cm forward and 15 cm back equals one cycle). The surface is then visually inspected for scratching. The results are categorized as excellent with no scratching, very good has no more than 3 very light and fine scratches, good has no more than 6 fine and light scratches, fair has deep scratching and poor indicates that the coating was broken through.

Many and varied additives may be used in conjunction with the polymeric materials of the present invention. Dyestuffs, leveling agents, flow control agents, conductive material, magnetic materials (e.g., particles), metal powders, metal oxide powders, ultraviolet radiation absorbers and many other additives are useful. Some modification of the polymer system may be desirable when other additives are provided to insure compatibility within the system. The most desirable ultraviolet radiation absorbers, e.g., substituted 2-hydroxybenzophenones and 2-(2′-hydroxyphenyl) benzotriazoles, do not tend to be soluble in large enough concentrations in the present system. It is therefore desirable to include 0–60% by weight flexibilizing epoxies of the formula:

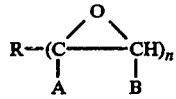

wherein R is an aliphatic or cycloaliphatic radical such that the monomer has a molecular weight of at least 100 per epoxy group, and more preferably 150 per epoxy group. n is the valence of R and is an integer of 2 to 6 (preferably 2), A and B are H or, when fused together, the atoms necessary to form a 5- or 6-membered cycloaliphatic ring. R must be selected so that when the flexibilizing epoxy is homopolymerized, the resulting polymer has a glass transition temperature ($T_g$) below −25° C. There should be no more than one ester or ether group in the R group, and hydrocarbon R groups are preferred.

A study of the following examples will enable a better understanding of the present invention.

EXAMPLES

Catalysts used in the following examples were provided in solution as follows:

A. $AlCl_3$, $ZnCl_2$ 5 weight percent in diethyl ether

Catalysts in the following examples are supplied in weight percents with regard to the amount of γ-glycidoxypropyl-trimethoxy silane used.

The silanes were supplied as 50% by weight solutions of partially hydrolyzed epoxy-terminated silanes in ethylacetate. The partially hydrolyzed intermediate is formed by mixing 600 g γ-glycidoxypropyltrimethoxy silane, 54.7 g methanol and 54.7 g water, and adding 0.5 ml of 0.1 N HCl in a flask and heating the mixture at reflux for 1.5 hours. Volatiles are removed using a rotary evaporator under the vacuum of a water aspirator and a water bath at a temperature of 40° C. The liquid prepolymer has a bulk viscosity of 48 centipoise and by proton nuclear magnetic resonance analysis shows an average of 1.6 methoxy groups for each silicon atom and that no reaction of the epoxy function had occurred. The residue was cooled and diluted to 50% by weight in ethylacetate.

In all examples, the catalyst solutions were mixed with the partially hydrolyzed intermediate solutions and coated on polyvinylidenechloride primed polyethyleneterephthalate (4 mil) using a wire-wound rod (#22 RDS rod).

Essentially any substrate benefitting from improved abrasion resistance can be coated. Primers may have to be used in some cases, however. Such substrates include thermoplastic polymers (e.g., polycarbonate, acrylics, polyesters, polyamides, polyvinyl chloride, polyolefin), thermosetting resins (e.g., epoxies, silanes, etc.), metal or metal coated substrates, painted surfaces, glass, ceramics, etc.

| Ex. | Catalyst Solution | Catalyst | Wt. % | Tack Free Time (Mins) Room Temp. | Cure Time (Mins) RmT | Cure Time (Mins) 90° C | Abrasion Resistance Steel Wool | Falling Sand % Hate |
|---|---|---|---|---|---|---|---|---|
| 1 | A | $AlCl_3$ | 1.0 | 120 | 180 | 30 | Fair-Good | 18.6 |
| 2 | A | $ZnCl_2$ | 1.0 | no cure | | | | |
| 3 | A | $SbCl_3$ | 1.0 | no cure | | | | |
| 4 | D | $BF_3 \cdot (CH_3CH_2)_2O$ | 1.0 | no cure | | | | |
| 5 | D | $BF_3(CH_3CH_2)_2O$ | 3.0 | 4 | 30 | 15 | Fair | 7.7 (rubbery) |
| 6 | C | $SbCl_5$ | 0.5 | 2 | 1440 | | Good | 10 |
| 7 | C | $SbCl_5$ | 0.25 | 5 | 60 | 30 | Good | 12 |
| 8 | F | $SbF_5$ | 0.5 | 5 | 1440 | | Excellent | 6.3 |
| 9 | F | $SbF_5$ | 0.25 | 5 | 1440 | | Very Good | 7.6 |
| 10 | F | $SbF_5$ | 0.25 | 5 | 30 | 15 | Excellent | 4.8 |
| 11 | G | $HSbF_6$ | 0.5 | 8 | 1440 | | Fair | 11.4 |
| 12 | G | $HSbF_6$ | 0.5 | 8 | 30 | 15 | Excellent | 5.4 |
| 13 | G | $HSbF_6$ | 0.25 | 15 | 30 | 15 | Very Good | 9.6 |
| 14 | H | $PF_5$ | 0.5 | 7 | 1440 | | Very Good | 6.6 |
| 15 | I | $PF_5$ | 0.25 | 4 | 1440 | | Very Good | 7.7 |
| 16 | J | $HBF_4$ | 3.0 | 180 | 1440 | 30 | Poor | 12.6 |
| 17 | K | $FeCl_3$ | 3.0 | 300 | 2880 | | Poor-Fair | 8.8 |
| 18 | L | $SbCl_5$ | 0.1 | 35 | | 15 | Very Poor | 54.8 |
| 19 | M | $SbF_5$ | 0.1 | 8 | | 15 | Very Good | 7.7 |
| 20 | M | $SbF_5$ | 0.05 | no cure | | | | |

B. $SnCl_4$ 2.5 weight percent in $ClCH_2CH_2Cl$
C. $SbCl_5$ 2.5 weight percent in ethylacetate
D. $BF_3 \cdot CH_3CH_2OCH_2CH_3$ 10 weight percent in diethyl ether
E. $SbF_5$ 7.6 weight percent in $CH_3CN$
F. $SbF_5$ 6.4 weight percent in (2:1) $ClCF_2CFCl_2$/ethylacetate
G. $HSbF_6$ 4.8 weight percent in $CH_3CN$
H. $PF_5$ 8.6 weight percent in $CH_3CN$
I. $PF_5$ 13.6 weight percent in diethyl ether
J. $HBF_4$ 40 weight percent in water
K. $FeCl_3$ 12.6 weight percent in diethyl ether
L. $SbCl_5$ 10 weight percent in ethylacetate
M. $SbF_5$ 10 weight percent in $ClCF_2CFCl_2$
N. $SbF_5$ 5 weight percent in $ClCF_2CFCl_2$
O. $SbCl_5$ 5 weight percent in ethylacetate

EXAMPLE 21

This example shows the use of the catalysts of the present invention with unhydrolyzed monomers.

To 10 grams of γ-glycidoxypropyltrimethoxy silane was added 0.05 g $SbF_5$ as a 6.4% by weight solution in $ClCF_2CFCl_2$/ethylacetate (2:1). This solution was immediately coated out as in the previous examples. The data for a cure for 24 hours at room temperature were 4.8% haze for the falling sand test and excellent results for steel wool abrasion.

The most preferred polymers of the present invention are those derived from monomers of the formula

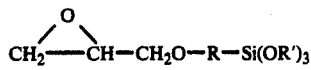

wherein R is alkylene of 1 to 4 and R' is alkyl of 1 to 4. All polymers of the present invention must comprise at least 15% by weight of units derived from the epoxy-terminated silanes. The remaining 0–85% by weight of the polymer being derived from units copolymerizable with the epoxy or silane functionality. Mono- or difunctional epoxies are desirable as are di-, tri-, and tetrafunctional silanes. Non-reactive fillers or additives may be used in the compositions, such as surfactants, flow control agents known to be useful for epoxy-terminated silanes such as polyvinyl butyral, cellulose acetate propionate and butyrate, etc.

Other copolymerizable materials include metal polyalkoxides such as those of the formula

in which M is Si, Al, Zr, Ti, or B,
R is an alkyl or acyl group of less than 10 carbon atoms,
R' is a hydrocarbon group of no more than 10 carbon atoms,
m + n equals the valence of M and m is at least 2.

Further examples of copolymerizable materials are styrene, methyl styrene, vinyl amides, and vinyl ethers.

EXAMPLE 22

A 50% by weight solution of the partially hydrolyzed (as in Example 1) monomer

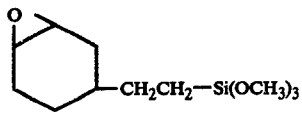

was combined with 1.0 weight percent SbF$_5$ from solution N. Tack free time at room temperature was 60 seconds. Room temperature cure for 36 hours produced good steel wool abrasion and falling sand abrasion of 15.1% haze.

EXAMPLE 23

To 37.5 grams of

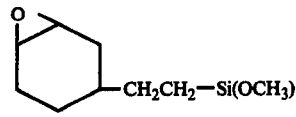

and 12.5 grams C$_6$H$_5$Si(OCH$_3$)$_3$ in ethylacetate (50% by weight total monomers) was added 0.5% by weight SbF$_5$ from solution N. Tack free time was 60 seconds. Room temperature cure for 36 hours produced good to fair steel wool abrasion resistance and 20.4% haze in the falling sand test.

What is claimed is:

1. An abrasion resistant coating on a substrate, said coating having at most 30% haze according to ASTM D 968-51 using 1 liter of sand in 10–11 seconds and comprising a polymer having at least 15% by weight units derived from an epoxy-terminated silane of the formulae:

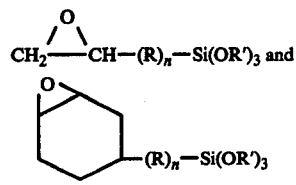

cured in the presence of a catalytically active amount of PF$_5$, SbF$_5$ or HSbF$_6$.

2. The abrasion resistant coating on a substrate of claim 1 wherein R is selected from alkylene of 1 to 10 carbon atoms and —CH$_2$—O—(CH$_2$)$_m$ wherein m is 1 to 5, n is 1, and R' is selected from alkyl of 1 to 4 carbon atoms.

3. The abrasion resistant coating on a substrate of claim 2 wherein the epoxy-terminated silane is of the formula

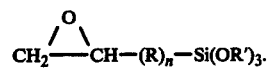

4. The abrasion resistant coating on a substrate of claim 3 wherein R is —CH$_2$—O—(CH$_2$)$_m$—.

* * * * *